Patented Sept. 2, 1924.

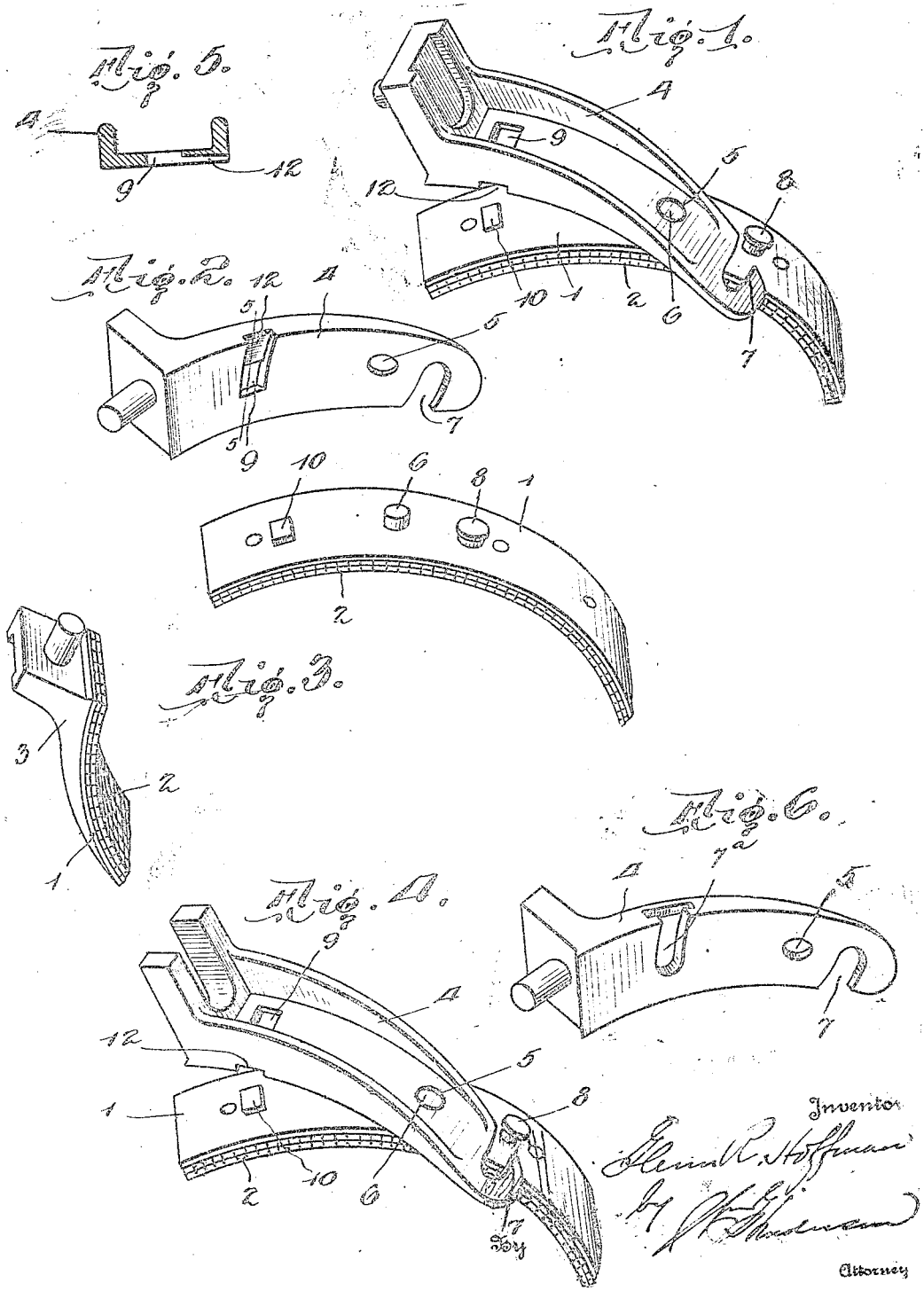

1,507,285

UNITED STATES PATENT OFFICE.

GLENN R. HOFFMAN, OF SPRINGFIELD, ILLINOIS, ASSIGNOR TO HOFFMAN MANUFACTURING COMPANY, OF SPRINGFIELD, ILLINOIS, A CORPORATION OF ILLINOIS.

TRANSMISSION BAND.

Application filed April 2, 1924. Serial No. 705,131.

*To all whom it may concern:*

Be it known that I, GLENN R. HOFFMAN, a citizen of the United States, residing at Springfield, in the county of Sangamon and State of Illinois, have invented certain new and useful Improvements in Transmission Bands; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to transmission or brake bands more particularly of the type usually employed in transmissions such as embodied in the Ford type of automobiles or trucks. In transmission bands of the character mentioned it is usual to have one or both of the ears of the band made removable or detachable so as to facilitate the installation and the removal of the band on and from the drums of the transmission in the narrow space of the casing available for the purpose as familiar to the skilled in the art.

The present invention has for its object to provide a construction in which the ear, one or both, may be readily and with ease attached to and detached from the transmission band, as occasion may require, by the user of the car without the necessity of employing or calling in a mechanic or a skilled workman for the purpose, and without the necessity of providing special attachments or accessories, additional to the ear, for securing or holding the ear to the band when placed in position, and in which the ear may be attached in an effective locking or interlocking with the band by a rotative or partial rotative movement of the ear relatively to the band whereby the manipulation of the ear is facilitated and made more convenient and expeditious than if the construction required a slidable movement for its attachment as in other constructions heretofore used.

To the accomplishment of the foregoing and such other objects as hereinafter are made to appear, the invention consists in the features hereinafter particularly described and then sought to be clearly defined by the claims, reference being had to the accompanying drawing forming a part hereof, and in which—

Figure 1 is a perspective of a portion of a transmission band, with the detachable ear positioned for attachment to the band;

Figure 2 is a perspective of the ear, detached;

Figure 3 is a perspective of a transmission band, with the ear of Figure 2 detached, and with an ear attached to the other end of the band;

Figure 4 is a perspective of an ear embodying the features of the present invention, and having the apertured or notched head of a common type to receive the shaft commonly used for actuating the band in applying or releasing the brake instead of the form of head and attached stud shown in the other figures;

Figure 5 is a cross section through on line 5—5 of Figure 2;

Figure 6 is a perspective of modified form of ear.

In the drawing the numeral 1 designates a band formed of resilient or spring metal commonly used in transmissions bands, and provided with the usual lining 2 attached by rivets, or otherwise, to the metal band. The illustration given in the drawing represents a slow-speed band for a Ford transmission with the present invention embodied in one of the band ears although ears embodying the invention may be used in connection with the reverse and the brake bands of the transmission, an illustration of the slow speed transmission band being sufficient for illustrative purposes. Usually the transmission band is made with one ear detachable and the other ear rigidly or permanently attached to one end of the band and sometimes both ears are detachably secured to the band, and most usually both ears are formed with an apertured or notched head as illustrated in Figure 4 to receive the shaft to which the pedal is connected for actuating the band as familiar to the skilled in the art. The present invention is capable of embodiment either in the ear of the type having a notched head to receive the band shaft, or in the type having studs projecting towards each other as in the low-speed type illustrated. In the illustration given one ear, for instance the ear 3, may be either permanently attached to one end of the band or detachably secured thereto as desired. The other ear 4 is detachable from the band for the easy installation and removal of the band when desired. Heretofore the detachable ear and the transmission band have been formed one with key-hole slots and the other with headed studs or buttons so that the heated studs may enter the enlarged portions of the key-hole slots and then the ear caused to slide so that the shank of the stud will fit in the narrow portion of the slot so that the ear is thus slidably applied to the band; and in some instances a spring actuated pin is caused to project through the ear and into an opening in the band to prevent accidental displacement of the ear from the band, and in other instances a pin projecting from the underside of the ear is caused to enter an opening in the band to assist other means in preventing displacement of the ear on the band. In such forms, however, the ear is slidably attached to or detached from the band. In other constructions the ear is formed with apertures or openings to receive studs projecting from the band to permit attachment and detachment of the ear without a slidable movement, cotter pins in some instances being passed through the studs to prevent the ear being accidentally displaced, and in at least one instance a pivoted catch is used to connect the band and ear so as to prevent accidental displacement of the ear. The present invention differs from the foregoing and from all other constructions of which I have knowledge in that under my construction the ear is attached to and detached from the band by a rotative instead of by a slidable movement, and is held in interlocking engagement therewith by a stud on one member being brought into an opening in the other in the rotative movement of the ear, and an arcuate slot or its equivalent in one end of the ear receiving a headed stud on the band, such interlocking means preventing accidental displacement of the ear on the band, and also distributing the points of strain between the ear and band when pressure is applied to the ears to contract the transmission band. One embodiment of the present invention, in its preferred form, consists in forming the detachable ear with a circular opening 5 designed to receive a stud or pin 6 projecting from the transmission band 1 which will constitute the pivot or axis of rotation of the ear relatively to the band in the operation of applying the ear to the band and also in removing it therefrom in the installation of the band to and from the proper drum of the transmission. The ear is also formed with an open ended slot 7 extending inwardly from one side or edge of the ear and preferably formed arcuate in outline or shape with the pivot 6 as the center of movement so that in rotation of the ear the hook end thereof formed as mentioned will engage and move concentrically about the shank of a headed stud or button 8 projecting from the band 1. The ear is also formed with an opening or socket 9 which is designed to receive a stud 10 projecting from the band 1, so that when the ear is in its operative position on the band the engagement of the stud 10 with the wall of the socket 9 in which it fits will check the rotation of the ear and secure the same against rotary movement in one direction and the engagement of the hook end of the ear against the stud 8 will prevent rotation of that end of the ear in the other direction and thus the ear will be brought into its proper position. It is preferred to form the stud 10 square or polygonal in cross section and its receiving socket likewise formed but they may be circular in formation without departure from the other features of the invention. In order to facilitate the rotation of the ear to bring it to its operative position on the band, a recess 12 is formed in the ear leading from the socket 9 outward towards the side of the ear and of a shape to permit rotative movement of the ear so that in placement of the ear and rotating it to its position the entrance of the stud will be first into this recess and in the rotation of the ear the tension on the spring or elastic band otherwise occasioned by contact between the stud and band will be eliminated and the ear is more easily rotated into position. When the ear is brought to its locking position the stud 10 will enter its receiving socket 9 and engage the walls thereof and thus be held against lateral displacement in either direction. It will be observed that the wall of the socket 9 next to the recess 12 is less in depth than the other walls of the socket so that while the ear will be prevented from lateral movement when its stud is fitting in its receiving socket, in order to release or unlock the ear it is only necessary to disengage the stud from the wall of lesser thickness which can be done by applying pressure to the ear to cause the side of the stud next to the wall of reduced thickness of the socket to disengage that wall and then the ear will be free to be rotated for detachment from the band. The engagement of the stud with the reduced wall of the socket, however, when fitting in the socket is sufficient to prevent accidental turning and disengagement of the ear from the band. The construction specified makes easier and facilitates the attachment and detachment of the ear, and the pivot or centering pin for the ear is a guide to the installer for the proper positioning of the ear for its application to the band.

As hereinbefore stated this invention is illustrated in connection with a slow speed transmission band, and of the particular type shown, but it may be embodied in a brake or a reverse band of a Ford transmission, as well as in other types of brake bands where adaptable, and is equally adaptable to transmission bands wherein the ears are formed with notched or apertured heads to receive the operating shafts of the bands, say of the type shown in Figure 4 of the drawing.

While I prefer the construction illustrated in Figures 1 to 4 of the drawing in which the slot at one end and the recess leading from the socket at the other end constitute practically openings in an arc having the pivotal connection between the ear and band as the center thereof so that a rotative interlocking coaction between the two ends of the ear and band will be the result, I may form at both ends of the ear an open ended slot similar to the slot 7, as illustrated for instance in Figure 6 of the drawing, one slot 7 opening from one side of the ear and the other 7ª from the opposite side, so that in the rotation of the ear the wall of each slot will grip the stud fitting therein with sufficient friction to hold the ear to the band so that it will not be accidentally displaced. In such case the stem of both studs may be round in cross section. It will also be understood that the open ended slots illustrated in Figure 6, and the open ended slot and lateral recess illustrated in Figures 1 to 4, may be formed on the opposite sides of the ear to those in the illustration given and their functioning will be the same the only difference being in the direction of rotation of the ear for effecting its attachment and detachment. While it is preferred, because of its advantages, to use the lateral recess 12 for communication with socket 9 which receives one of the studs, as illustrated in Figures 1 to 4, said recess may be omitted and in that event the stud 10 will bear against the underside of the ear until in the rotation of the ear the stud is brought into register with the socket 9 when by spring action of the band it will enter the socket, but when the lateral entering recess is used the stud is gradually brought into position, relieved from the tension of such spring influence, until the stud and socket register with each other when the entry of the stud into the socket occurs. The variations described are sought to be included under the scope of some of the appended claims.

From the foregoing it will be understood that while I have illustrated and described the preferred details of the different features or elements the details may be different and some of the features omitted or replaced by others or transposed without departing from the invention as sought to be defined by the appended claims.

Having described my invention and set forth its merits what I claim is:—

1. A transmission band, and a detachable ear, the band and ear having a pivotal connection one with the other, said band and ear being so formed as to permit the ear to be attached to and detached from the band by rotative movement of the ear relatively to the band.

2. A transmission band, a detachable ear pivotally connected with the band and formed with a laterally extending slot, and a stud attached to the band and positioned for engagement and disengagement with the slotted ear in rotative movement of the ear.

3. A transmission band, a detachable ear pivotally connected with the band and formed with an arcuate slot having the pivot of the ear as its center, and a stud projecting from the band and positioned for engagement and disengagement with the slotted ear in rotation of the ear.

4. A transmission band, a detachable ear pivotally connected with the band, the ear and band being formed one with studs and the other with openings to receive the studs, the openings being in an arc with the pivot of the ear and band as the center and one opening extending in the opposite direction to the other transversely to the ear.

5. A transmission band, a detachable ear pivotally connected with the band, the ear and band being formed one with studs and the other with openings to receive the studs disposed between the pivotal connection with the band and the ends of the ear, one of the openings being in an arc with the pivotal connection as its center.

6. A transmission band, a detachable ear pivotally connected with the band, the ear and band being formed with cooperating studs and openings disposed between the pivotal connection and ends of the ears, one of the openings being disposed in an arc with the pivotal connection as its center and the other polygonal in cross section.

7. A transmission band, a detachable ear pivotally connected therewith, the ear and band being formed with cooperating studs and openings disposed between the pivotal connection and ends of the ear, one opening being in an arc with the pivotal connection as its center and the other having a recess in communication therewith and disposed in an arc with the pivotal connection as its center.

8. A transmission band, a detachable ear pivotally connected therewith, the ear and band being formed with cooperating studs and openings disposed between the pivotal connection and ends of the ear, one of the openings having its wall on the side for entry of its cooperating stud of less depth than the other portions of its wall.

9. A detachable ear for transmission bands formed with an opening to receive a centering stud about which it may be rotated and with an opening formed in an arc with the centering stud opening as its center to receive an attaching stud and with a second-opening to the other side of the centering stud opening to receive another attaching stud.

10. A detachable ear for transmission bands formed with an opening to receive a centering stud about which it may be rotated and with an opening formed in an arc with the centering stud opening as its center to receive an attaching stud and with a second opening to receive another attaching stud and with a recess in communication therewith formed in an arc with the centering stud opening as its center.

11. A detachable ear for transmission bands formed with an opening to receive a centering stud about which it may be rotated and with an opening formed in an arc with the centering stud opening as its center to receive another attaching stud and with a second opening to receive another attaching stud, said second opening having its wall on the side receiving the attaching stud of less depth than the other portions of its wall.

12. A detachable ear for transmission bands formed with an opening to receive a centering stud about which it may be rotated and with an opening formed in an arc with the centering stud opening as its center to receive an attaching stud and with a second opening to receive another attaching stud, said second opening having a laterally extending recess communicating therewith.

13. A detachable ear for transmission bands formed with an opening to receive a centering stud about which the ear may be rotated and with an opening formed in an arc with the centering stud opening as its center and with a second opening to receive another attaching stud, said second opening being polygonal in cross-section to receive a correspondingly shaped stud.

14. A transmission band adapted to receive a detachable ear formed with a centering stud to receive an ear adapted to rotate about the stud and with an attaching stud to cooperate with a slot formed in the ear in an arc having the centering stud as its center and having a second attaching stud positioned to enter another opening in the ear on the other side of the centering stud.

In testimony whereof I affix my signature in presence of two witnesses.

GLENN R. HOFFMAN.

Witnesses:
 DAVID H. PAULDING,
 ROZY McKOWN.